United States Patent
Li et al.

(10) Patent No.: US 9,014,104 B2
(45) Date of Patent: Apr. 21, 2015

(54) TRANSMIT POWER CONTROL BASED ON RECEIVER GAIN SETTING IN A WIRELESS COMMUNICATION NETWORK

(75) Inventors: Junyi Li, Chester, NJ (US); Ying Wang, Easton, PA (US); Aleksandar Jovicic, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 945 days.

(21) Appl. No.: 12/264,679

(22) Filed: Nov. 4, 2008

(65) Prior Publication Data

US 2010/0110999 A1    May 6, 2010

(51) Int. Cl.
*H04W 72/04* (2009.01)
*H04W 52/52* (2009.01)
*H04W 52/24* (2009.01)
*H04W 52/38* (2009.01)

(52) U.S. Cl.
CPC ............ *H04W 52/52* (2013.01); *H04W 52/242* (2013.01); *H04W 52/383* (2013.01)

(58) Field of Classification Search
CPC .................................................... H04W 68/00
USPC ......... 370/328–329, 347, 342, 337, 316–318, 370/389, 252; 455/435, 452, 458, 450, 509, 455/522, 426.1
See application file for complete search history.

(56) References Cited

U.S. PATENT DOCUMENTS 6,272,322 B1 *  8/2001  Su ............................... 455/67.14
6,807,165 B2 * 10/2004  Belcea .......................... 370/347
6,925,286 B1 *  8/2005  Kraiem et al. ................ 455/13.4
7,006,483 B2 *  2/2006  Nelson et al. ................. 370/342
7,187,915 B2     3/2007  Wang et al.
2003/0189906 A1 10/2003  Belcea
2004/0196890 A1 * 10/2004  Zeira et al. .................... 375/130
2006/0050698 A1  3/2006  Aytur et al.

(Continued)

FOREIGN PATENT DOCUMENTS

CN           101123782 A     2/2008
EP           1475924 A1     11/2004

(Continued)

OTHER PUBLICATIONS

International Search Report and Written Opinion—PCT/US2009/061283, International Search Authority—European Patent Office—Mar. 25, 2010.

(Continued)

*Primary Examiner* — Michael T Vu
(74) *Attorney, Agent, or Firm* — James K. O'Hare (57) ABSTRACT

Techniques for performing transmit power control based on receiver gain setting in a wireless communication network are described. In an aspect, a terminal A may estimate pathloss to another terminal B, e.g., based on a peer discovery signal received from terminal B. Terminal A may then determine a transmit power level for a peer-to-peer (PTP) signal (e.g., a paging signal) based on the estimated pathloss, a receiver gain setting at terminal B, and a target received power level for the PTP signal. Terminal A may send the PTP signal at the determined transmit power level to terminal B. In another aspect, terminal B may use different receiver gain settings in different time intervals to receive PTP signals from other terminals. Terminal A may then select a suitable time interval to send the PTP signal based on the pathloss and the different receiver gain settings used by terminal B.

19 Claims, 9 Drawing Sheets

(56) References Cited

U.S. PATENT DOCUMENTS

| | | | |
|---|---|---|---|
| 2006/0088021 A1 | 4/2006 | Nelson et al. | |
| 2006/0168343 A1* | 7/2006 | Ma et al. | 709/245 |
| 2008/0242338 A1 | 10/2008 | Yamamoto | |
| 2008/0267141 A1* | 10/2008 | Ren et al. | 370/337 |

FOREIGN PATENT DOCUMENTS

| | | | |
|---|---|---|---|
| JP | 2000184435 A | 6/2000 | |
| JP | 2004297201 A | 10/2004 | |
| JP | 2008244960 A | 10/2008 | |
| WO | WO03079611 A1 | 9/2003 | |
| WO | 2007082249 | 7/2007 | |
| WO | WO-2008070530 A2 | 6/2008 | |

OTHER PUBLICATIONS

Taiwan Search Report—TW098137480—TIPO—Oct. 15, 2012.

* cited by examiner

TRANSMIT POWER CONTROL BASED ON RECEIVER GAIN SETTING IN A WIRELESS COMMUNICATION NETWORK

BACKGROUND

I. Field

The present disclosure relates generally to communication, and more specifically to techniques for controlling transmit power in a wireless communication network.

II. Background

Wireless communication networks are widely deployed to provide various communication services such as voice, video, packet data, messaging, broadcast, etc. These wireless networks may be capable of supporting communication for multiple users by sharing the available network resources. Examples of such wireless networks include wireless wide area networks (WWANs), wireless metropolitan area networks (WMANs), and wireless local area networks (WLANs).

In a wireless communication network, a terminal may transmit a signal to another terminal for peer-to-peer communication. The signal should be transmitted at sufficiently high power so that the recipient terminal can correctly decode the signal with high probability. However, transmitting the signal at too high a power level may cause excessive interference to other terminals. It is thus desirable to transmit the signal such that the recipient terminal can reliably receive the signal while reducing interference to other terminals.

SUMMARY

Techniques for performing transmit power control based on receiver gain setting in a wireless communication network are described herein. In an aspect, a terminal A may determine a transmit power level to use for a peer-to-peer (PTP) signal based on pathloss and a receiver gain setting at a recipient terminal B. This may ensure that terminal B can decode the PTP signal with high probability while reducing interference to other terminals. In one design, terminal A may estimate the pathloss to terminal B, e.g., based on a peer discovery signal received from terminal B. Terminal A may determine a receiver gain setting at terminal B, which may be known a priori by terminal A or signaled by terminal B. Terminal A may determine a transmit power level for a PTP signal (e.g., a paging signal) based on the estimated pathloss, the receiver gain setting at terminal B, and a target received power level for the PTP signal. Terminal A may then send the PTP signal at the determined transmit power level to terminal B.

In another aspect, terminal B may use different receiver gain settings in different time intervals to receive PTP signals from other terminals. This may allow terminals at different distances to terminal B to transmit PTP signals at proper power levels to terminal B. In one design, terminal B may select different receiver gain settings in different time intervals, e.g., based on a pattern. Terminal B may receive PTP signals from other terminals in each time interval based on a receiver gain setting selected for that time interval. For example, terminal B may receive paging signals from other terminals with high (or low) pathloss during time intervals in which high (or low) receiver gain setting is selected.

Terminal A may select a suitable time interval for sending a PTP signal to terminal B based on the pathloss between terminals A and B and the different receiver gain settings used by terminal B in different time intervals. Terminal A may then determine a transmit power level for the PTP signal based on the receiver gain setting used by terminal B in the selected time interval, the pathloss, and the target received power level for the PTP signal. Terminal A may then send the PTP signal at the determined transmit power level and in the selected time interval to terminal B.

Various aspects and features of the disclosure are described in further detail below.

DETAILED DESCRIPTION

The techniques described herein may be used for various wireless communication networks such as WWANs, WMANs, WLANs, etc. The terms "network" and "system" are often used interchangeably. A WWAN may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement a radio technology such as Universal Terrestrial Radio Access (UTRA), cdma2000, etc. A TDMA network may implement a radio technology such as Global System for Mobile Communications (GSM). An OFDMA network may implement a radio technology such as Evolved UTRA (E-UTRA), Ultra Mobile Broadband (UMB), Flash-OFDM®, etc. Long Term Evolution (LTE) is an upcoming release of "3rd Generation Partnership Project" (3GPP) that uses E-UTRA, which employs OFDMA on the downlink and SC-FDMA on the uplink. A WLAN may implement one or more standards in the IEEE 802.11 family of standards (which is also referred to as Wi-Fi), Hiperlan, etc. A WMAN may implement one or more standards in the IEEE 802.16 family of standards (which is also referred to as WiMAX). The techniques described herein may be used for the radio technologies mentioned above as well as other radio technologies.

Figure 1:
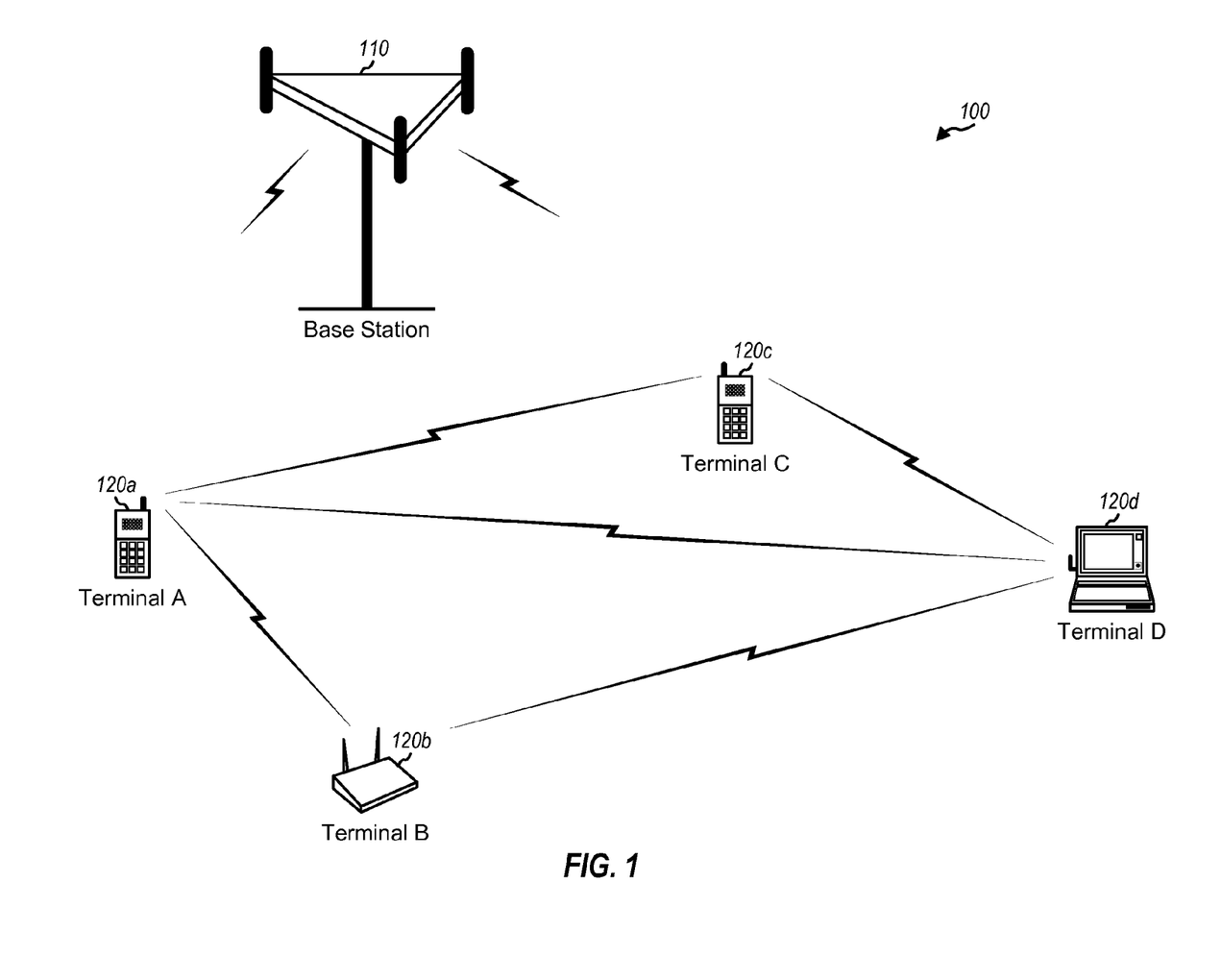
FIG. 1 shows a wireless communication network.

FIG. 1 shows a wireless communication network 100, which may include a number of base stations and a number of terminals. For simplicity, only one base station 110 and four terminals 120a, 120b, 120c and 120d are shown in FIG. 1. A base station may be a fixed station that communicates with the terminals and may also be referred to as an access point, a Node B, an evolved Node B (eNB), etc. Base station 110 provides communication coverage for a particular geographic area. The term "cell" can refer to a coverage area of the base station and/or a base station subsystem serving this coverage area.

Terminals 120 may be dispersed throughout the network, and each terminal may be stationary or mobile. A terminal may also be referred to as an access terminal, a mobile station, a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station and/or may receive information (e.g., timing information) from the base station. Alternatively or additionally, the terminal may communicate peer-to-peer with other terminals.

Figure 2:
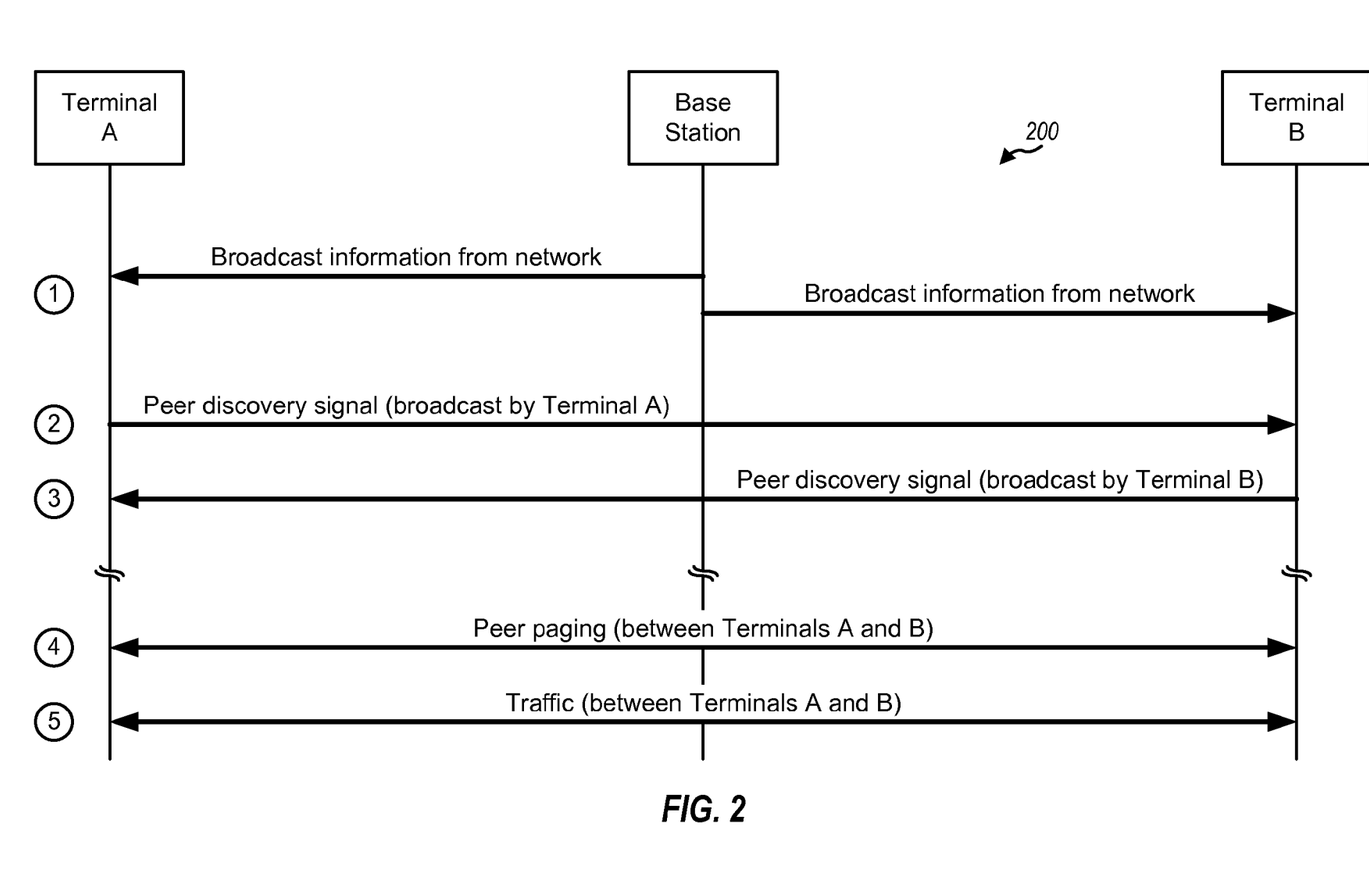
FIG. 2 shows an example message flow for peer-to-peer communication.

FIG. 2 shows a design of a message flow 200 that may be used for peer-to-peer communication between two terminals A and B in wireless network 100. Initially (e.g., at power up), terminals A and B may each receive broadcast information from base station 110 (step 1). Each terminal may obtain timing and possibly other information from the broadcast information. Terminal A may periodically broadcast a peer discovery signal to allow other terminals within the vicinity to detect terminal A (step 2). Similarly, terminal B may periodically broadcast a peer discovery signal to allow other terminals within the vicinity to detect terminal B (step 3). Terminals A and B may detect the presence of one another via the peer discovery signals. Thereafter, terminals A and B may page one another whenever there is data to send (step 4). A connection may then be established, and terminals A and B may exchange signaling and traffic data via the connection (step 5).

FIG. 2 shows an exemplary message flow that may be used for peer-to-peer communication. In general, a message flow for peer-to-peer communication may include any number of messages and any type of message.

Figure 3:
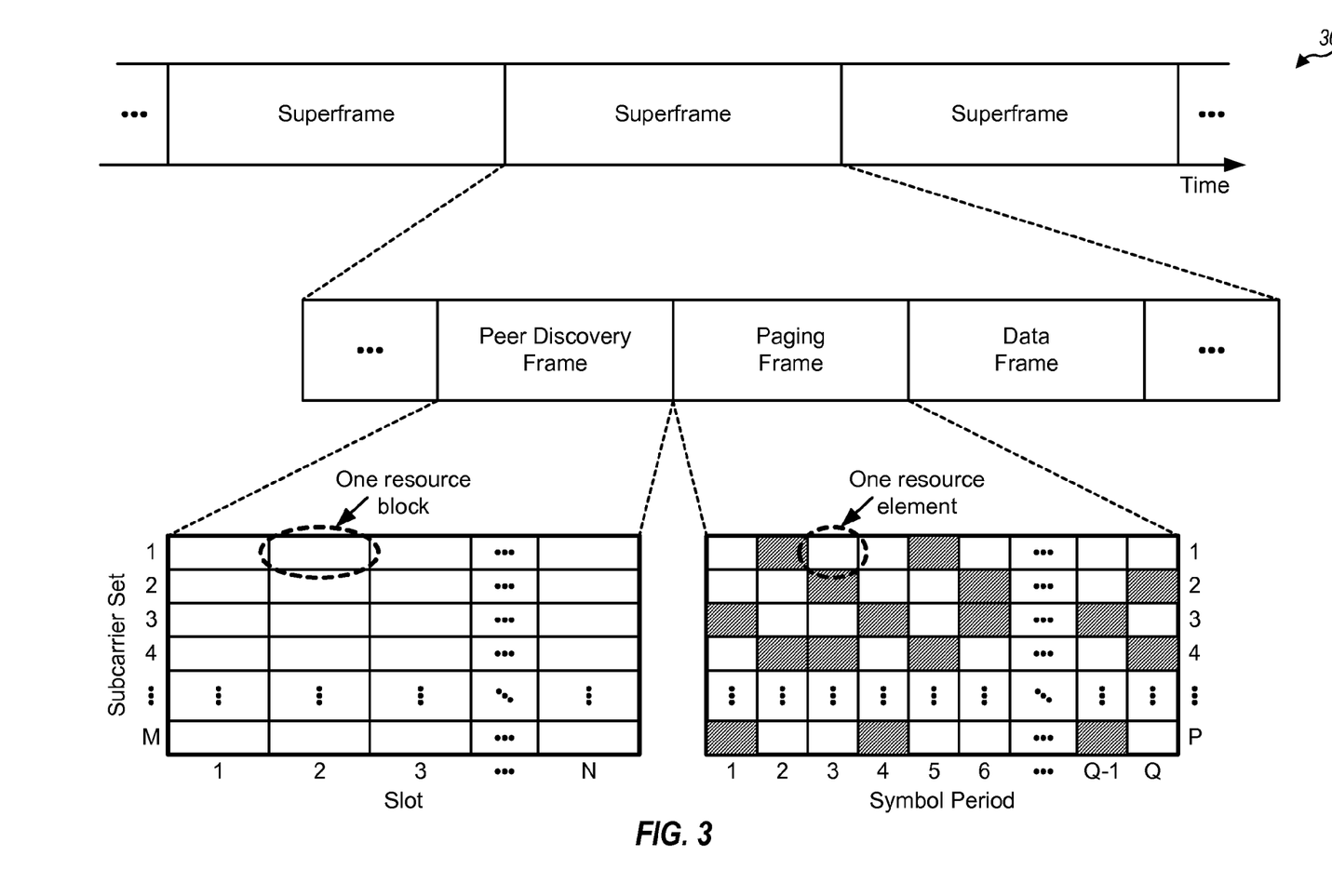
FIG. 3 shows an example transmission structure.

FIG. 3 shows a design of a transmission structure 300 that may be used for wireless network 100. The transmission timeline may be partitioned into units of superframes. Each superframe may cover a fixed or variable time duration and may be partitioned into a number of frames. In the design shown in FIG. 3, different types of information may be sent in different frames. Some frames may be used to send peer discovery signals and may be referred to as peer discovery frames. Some other frames may be used to send paging signals and may be referred to as paging frames. Many or most frames may be used to send data and may be referred to as data frames. Other types of frames may also be defined. The different types of frames may have the same or different time durations.

In general, peer discovery frames may be spaced apart by any suitable duration. Paging frames may also be spaced apart by any suitable duration. The peer discovery frames and the paging frames may have the same or different periodicity.

FIG. 3 also shows a design of a peer discovery frame. In this design, the peer discovery frame is partitioned into N slots with indices of 1 through N, where N may be any integer value. Each slot includes S symbol periods, where S may be any integer value.

The system bandwidth may be partitioned into multiple (K) subcarriers with orthogonal frequency division multiplexing (OFDM) or single-carrier frequency division multiplexing (SC-FDM). M subcarrier sets with indices of 1 through M may be defined, where $M \leq K$. Each subcarrier set may include one or more subcarriers. Resource blocks may be defined based on the available slots and subcarrier sets in the peer discovery frame. In the design shown in FIG. 3, a resource block covers one subcarrier set in one slot. A resource block may be used by one terminal to send its peer discovery signal. A collision occurs when multiple terminals send their peer discovery signals on the same resource block.

FIG. 3 also shows a design of a paging frame. In this design, the paging frame includes Q symbol periods with indices of 1 through Q, where Q may be any integer value. P subcarrier sets with indices of 1 through P may be formed based on the K total subcarriers, where $P \leq K$. Each subcarrier set may include one or more subcarriers. Resource elements may be defined based on the available symbol periods and subcarrier sets in the paging frame. In the design shown in FIG. 3, a resource element covers one subcarrier set in one symbol period, and P*Q resource elements are available in the paging frame. A terminal may send a paging signal on a set of resource elements, which may be pseudo-randomly selected from among the P*Q available resource elements in the paging frame. Different terminals may simultaneously send their paging messages on different sets of resource elements in the same paging frame to different recipient terminals. The paging signal from each terminal may be correctly decoded by the recipient terminal even though there may be collision on some resource elements.

A terminal may periodically broadcast a peer discovery signal to announce its presence to other terminals in the vicinity. The terminal may broadcast its peer discovery signal at the maximum power so that it can be discovered by other terminals as far away as possible. The terminal may broadcast its peer discovery signal on resource blocks that are not intended to be shared with other terminals. Hence, using maximum transmit power for the peer discovery signal may not adversely impact network performance.

The terminal may also transmit a paging signal to another terminal that it wants to communicate with. The terminal may transmit the paging signal at sufficiently high power so that the recipient terminal can correctly decode the paging signal with high probability. The terminal may transmit the paging signal on resource elements that may be shared with other terminals, e.g., as shown in FIG. 3. Hence, the terminal should control its transmit power for the paging signal in order to reduce interference on the shared resource elements.

The terminal may also receive peer discovery signals and paging signals from other terminals. The terminal may perform automatic gain control (AGC) to set the gain of its receiver to a proper value. A receiver gain may also be referred to as an AGC gain, etc. Using a proper receiver gain may ensure that clipping of an analog-to-digital-converter (ADC) at the terminal and degradation due to ADC clipping can both be avoided.

The terminal may perform AGC for peer discovery signals from other terminals as follows. The terminal may first set the receiver gain to an initial gain setting, e.g., the lowest gain setting. The terminal may measure the energy of a received signal, e.g., the energy of a cyclic prefix of a received OFDM symbol. The terms "energy" and "power" are related and are often used interchangeably. The terminal may increase the receiver gain if the measured energy is below a target value or decrease the receiver gain if the measured energy is above the target value. The target value may be selected such that the signal provided to the ADC is at the proper amplitude. In the design shown in FIG. 3, multiple terminals may simultaneously transmit peer discovery signals on different resource blocks in the same slot. The terminal may adjust its receiver gain based on the energy of the strongest received terminal.

The terminal may also perform AGC for paging signals. However, the terminal may not know which peer terminals will send paging signals to the terminal. It may be desirable for the terminal to adjust its receiver gain as little as possible when receiving paging signals.

In an aspect, a terminal may determine a transmit power level to use for a paging signal based on pathloss and a receiver gain setting at a recipient terminal. A receiver gain setting is an initial receiver gain used by a recipient terminal, which may vary this initial receiver gain to obtain a desired signal level. A receiver gain setting may also be referred to as a receiver gain mode, an AGC gain setting, an AGC mode, etc. In any case, the transmit power level may be controlled such that the recipient terminal can decode the paging signal with high probability while reducing interference to other terminals.

Figure 4:
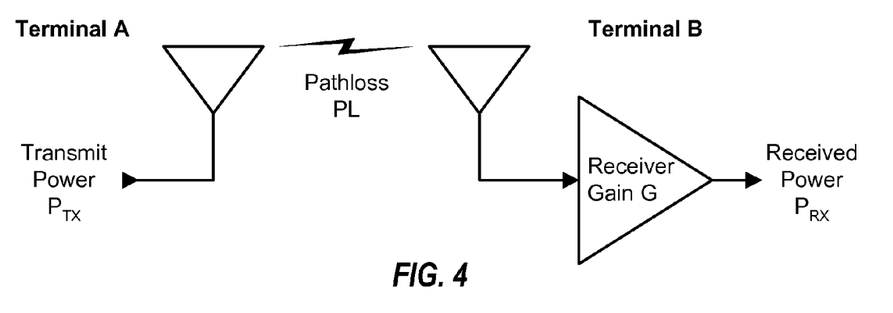
FIG. 4 shows transmission from one terminal to another terminal.

FIG. 4 shows transmission from one terminal A to another terminal B. Terminal A may transmit a paging signal at a power level of $P_{TX}$ via a wireless channel having a pathloss of PL. Terminal B may receive the paging signal from terminal A, amplify the received signal with a receiver gain of G, and obtain a received power level of $P_{RX}$. The received power level may be expressed as:

$$P_{RX} = P_{TX} - PL + G. \qquad \text{Eq (1)}$$

In the description herein, transmit power and received power are given in units of decibel relative to one milliwatt (dBm). Pathloss and gain are given in units of decibel (dB). Terminal A may perform power control and select a suitable transmit power level based on knowledge of a target received power level for the paging signal, the pathloss from terminal A to terminal B, and a receiver gain setting at terminal B.

Figure 5:
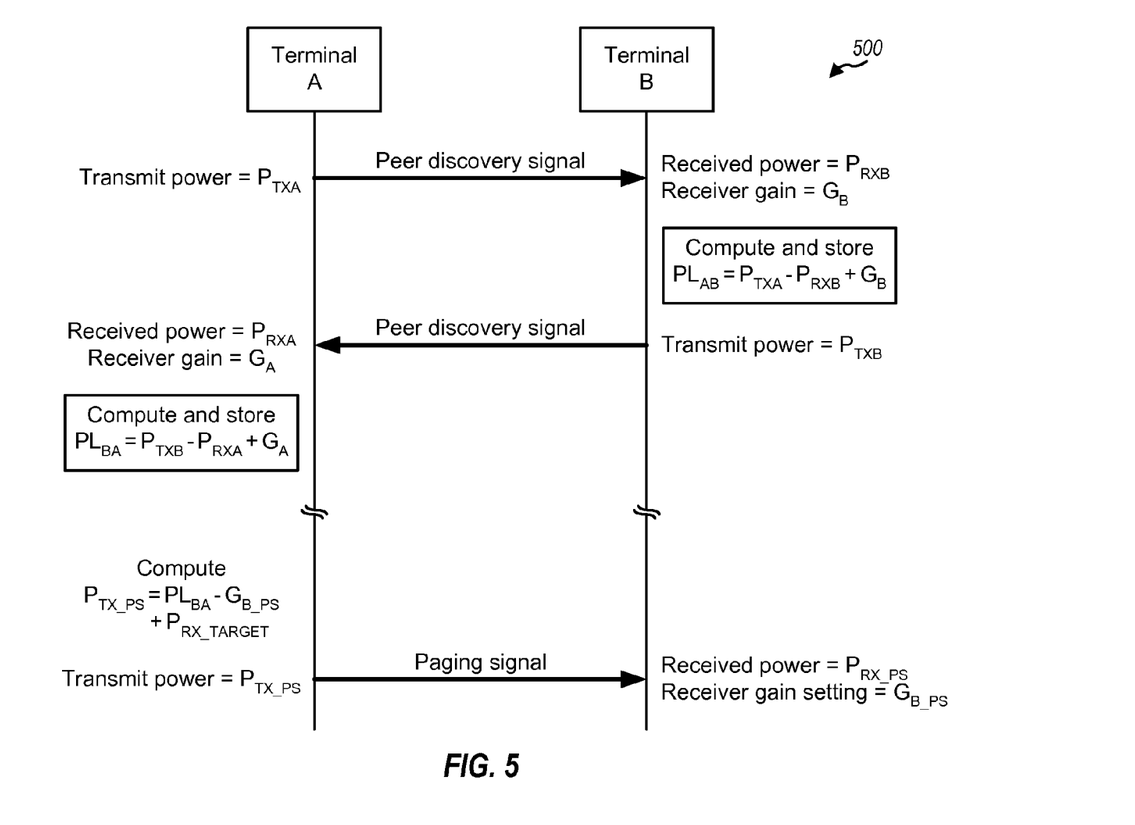
FIG. 5 shows a design of transmitting a paging signal with power control based on receiver gain setting.

FIG. 5 shows a design of transmitting a paging signal from terminal A to terminal B with power control based on receiver gain setting. During a peer discovery phase, terminal A may transmit a peer discovery signal at a transmit power level of $P_{TXA}$. Terminal B may receive the peer discovery signal at a received power level of $P_{RXB}$ and may determine the pathloss from terminal A to terminal B, as follows:

$$PL_{AB} = P_{TXA} - P_{RXB} + G_B, \qquad \text{Eq (2)}$$

where $PL_{AB}$ is the pathloss from terminal A to terminal B, and
$G_B$ is the receiver gain at terminal B for the peer discovery signal from terminal A. Terminal B may store the pathloss $PL_{AB}$ for terminal A.

Similarly, terminal B may transmit a peer discovery signal at a transmit power level of $P_{TXB}$. Terminal A may receive the peer discovery signal at a received power level of $P_{RXA}$ and may determine the pathloss from terminal B to terminal A, as follows:

$$PL_{BA} = P_{TXB} - P_{RXA} + G_A, \qquad \text{Eq (3)}$$

where $PL_{BA}$ is the pathloss from terminal B to terminal A, and
$G_A$ is the receiver gain at terminal A for the peer discovery signal from terminal B. Terminal A may store the pathloss $PL_{BA}$ for terminal B.

The network may utilize time division duplexing (TDD), and all terminals may transmit on the same frequency spectrum. In this case, the pathloss from terminal A to terminal B may be approximately equal to the pathloss from terminal B to terminal A. Furthermore, the transmit power level for the peer discovery signal may be fixed at a predetermined level of $P_{TX\_PDS}$, so that $P_{TXA} = P_{TXB} = P_{TX\_PDS}$. In this case, terminal A may be able to determine the pathloss $P_{BA}$ from terminal B to terminal A based on (i) the known transmit power of $P_{TX\_PDS}$, (ii) the received power level of the peer discovery signal, and (iii) the receiver gain at terminal A, as shown in equation (3). Terminal A may then estimate the pathloss from terminal A to terminal B as $P_{AB} \cong P_{BA}$. In general, each terminal may determine the pathloss between that terminal and another terminal based on a peer discovery signal received from the other terminal. Each terminal may store a table of pathloss for each peer terminal discovered by that terminal and may update this table whenever peer discovery signals are received from other terminals.

As shown in FIG. 5, terminal A may desire to send a paging signal to terminal B. Terminal A may first determine a transmit power level to use for the paging signal, as follows:

$$P_{TX\_PS} = PL_{BA} - G_{B\_PS} + P_{RX\_TARGET}, \qquad \text{Eq (4)}$$

where
$G_{B\_PS}$ is a receiver gain setting at terminal B for the paging signal,
$P_{RX\_TARGET}$ is a target received power level for the paging signal, and
$P_{TX\_PS}$ is the transmit power level for the paging signal.

In one design, terminal A may assume that terminal B will use the maximum receiver gain setting of $G_{max}$ for the paging signal, so that $G_{B\_PS} = G_{max}$. In another design, terminal A may assume that terminal B will use a predetermined receiver gain setting for the paging signal. The maximum receiver gain setting and the predetermined receiver gain setting may be known to all terminals. In yet another design, the receiver gain setting at terminal B for the paging signal may be conveyed by terminal B (e.g., in the peer discovery signal) or may be ascertained by terminal A in some other manner.

In one design, the target received power level may be dependent on the modulation and coding scheme used for the paging signal and may be known a priori by all terminals. In another design, each terminal may provide its target received power level, e.g., in the peer discovery signal. In any case, terminal A may have knowledge of the target received power level for the paging signal.

In the design shown in equation (4), the transmit power level is determined by the target received power level and is further increased by the pathloss and decreased by the receiver gain setting. For example, if the target received power level is 0 dBm, the pathloss is −10 dB, and the receiver gain setting is +50 dB, then the transmit power level is −40 dBm. In general, higher transmit power may be used for greater pathloss, and vice versa. Higher transmit power may also be used for lower receiver gain setting, and vice versa. The design in equation (4) may ensure that the paging signal will be transmitted at the lowest power level that will allow terminal B to correctly decode the paging signal with high probability while reducing interference. The transmit power level may also be increased by a margin (e.g., several dBs) to account for inaccuracy in estimating pathloss.

A given terminal X may use the same receiver gain setting to receive the paging signals from all peer terminals. If terminal X uses a maximum receiver gain setting, then a nearby terminal may need to transmit at a very low power level in order to avoid clipping the ADC at terminal X. The nearby terminal may not be able to transmit at such a low power level. Conversely, if terminal X uses a minimum receiver gain setting, then a faraway terminal may need to transmit at a very high power level in order to be received at a sufficient power level by terminal X. The faraway terminal may not be able to transmit at such a high power level.

In another aspect, a terminal may use different receiver gain settings in different paging intervals to receive paging signals from peer terminals. The receiver gain settings may be selected based on a pattern that may be known by peer terminals interested in sending paging signals to this terminal. A peer terminal may select an appropriate paging interval to send a paging signal to the terminal based on the known pattern. The peer terminal may also determine a transmit power level for the paging signal based on the receiver gain setting for the selected paging interval.

Figure 6:
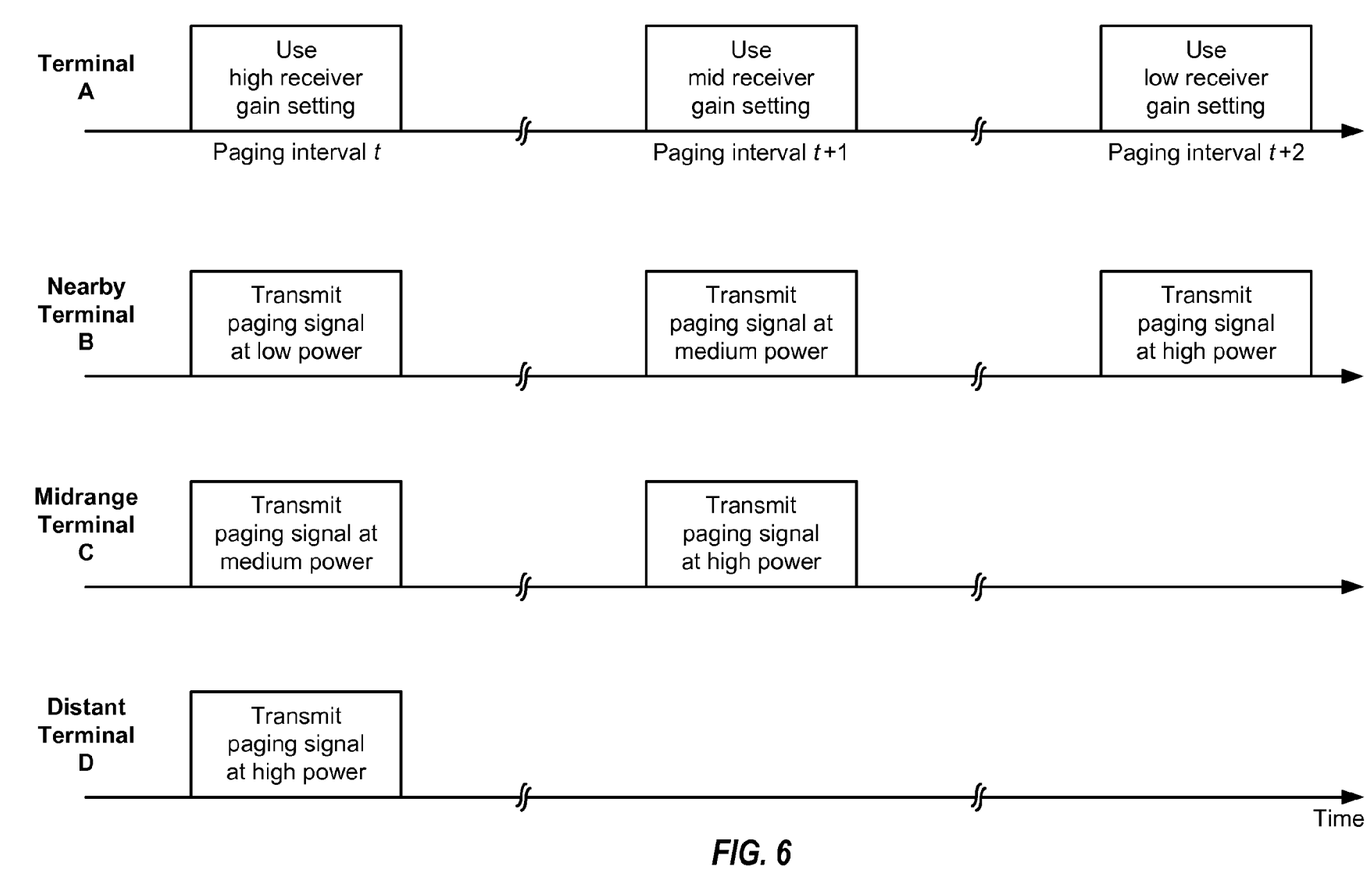
FIG. 6 shows a design of receiving paging signals with different receiver gain settings.

FIG. 6 shows a design of receiving paging signals with different receiver gain settings. In the design shown in FIG. 6, terminal A uses three different receiver gain settings for receiving paging signals from peer terminals. In particular, terminal A uses a high receiver gain setting of $G_{HIGH}$ in paging interval t to receive paging signals from distant peer terminals and possibly closer terminals. Terminal A uses a mid receiver gain setting of $G_{MID}$ in paging interval t+1 to receive paging signals from midrange terminals and possibly closer terminals. Terminal A uses a low receiver gain setting of $G_{LOW}$ in paging interval t+2 to receive paging signals from nearby terminals.

Terminal B may be located close to terminal A and may have low pathloss to terminal A. Terminal B may transmit a paging signal to terminal A at low power in paging interval t, at medium power in paging interval t+1, or at high power in paging interval t+2. Terminal B may determine the transmit power level for each paging interval based on the receiver gain setting used by terminal A in that paging interval, the pathloss from terminal B to terminal A, and the target received power level for the paging signal, as shown in equation (4).

Terminal C may be located a midrange to terminal A and may have medium pathloss to terminal A. Terminal C may transmit a paging signal to terminal A at medium power in paging interval t or at high power in paging interval t+1. Terminal C may determine the transmit power level for each paging interval based on the receiver gain setting used by terminal A in that paging interval, the pathloss from terminal C to terminal A, and the target received power level for the paging signal.

Terminal D may be located far away from terminal A and may have high pathloss to terminal A. Terminal D may transmit a paging signal to terminal A at high power in paging interval t. Terminal D may determine the transmit power level for the paging signal based on the receiver gain setting used by terminal A in paging interval t, the pathloss from terminal D to terminal A, and the target received power level for the paging signal.

In the design shown in FIG. 6, a receiver gain pattern includes three different receiver gain settings in three paging intervals. A peer terminal may be able to transmit a paging signal to terminal A in one or more paging intervals in the pattern depending on (i) the pathloss and the transmit capability of the peer terminal and (ii) the specific receiver gain settings used by terminal A. FIG. 6 suggests that a nearby terminal may have more choices of paging intervals than a distant terminal. This may or may not be true depending on the specific receiver gain settings used by terminal A. FIG. 6 also suggests that some paging intervals (e.g., paging interval t) may be more susceptible to collision. Collision probability may be controlled by controlling which peer terminals can transmit in each paging interval. For example, terminal B may not be allowed to transmit a paging signal to terminal A in paging interval t or may transmit a paging signal only if the priority is high.

In general, a given terminal X may use any number of different receiver gain settings to receive paging signals from peer terminals. Terminal X may cycle through these different receiver gain settings based on a pattern that may indicate a specific receiver gain setting to use in each paging interval. Peer terminals may know the pattern and may be able to select appropriate paging intervals to transmit paging signals to terminal X.

A peer terminal may know the receiver gain setting to be used by terminal X in each upcoming paging interval. The peer terminal may choose an appropriate paging interval to page terminal X based on various considerations such as paging latency, the transmit power capability of the peer terminal, the pathloss to terminal X, the target received power level, etc. The peer terminal may wait until terminal X is at the proper receiver gain setting before sending a paging signal. The peer terminal may use the pathloss to determine the transmit power level for the paging signal.

Terminal X may receive paging signals from peer terminals at close to the target received power level in each paging interval. Terminal X may perform only minor receiver gain adjustment in each paging interval to obtain the desired signal level. Performance may improve by avoiding drastic instantaneous receiver gain adjustment at terminal X.

In one design, all terminals may use the same receiver gain pattern. However, the pattern may start at different paging intervals for different terminals. For example, the pattern shown in FIG. 6 may be used by all terminals, terminal A may use the high receiver gain setting in paging interval t, terminal B may use the high receiver gain setting in paging interval t+1, terminal C may use the high receiver gain setting in paging interval t+2, etc. In another design, different terminals may use different receiver gain patterns. The pattern for each terminal may be selected based on the capabilities of the terminal, its environment, etc. Each terminal may provide its pattern to other terminals, e.g., via the peer discovery signal.

Figure 7:
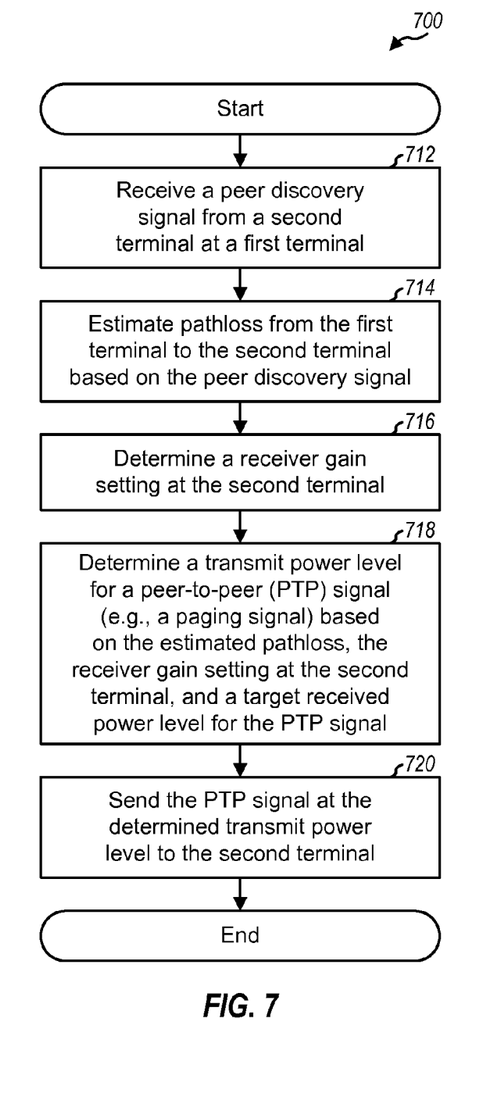
FIG. 7 shows a process for sending a PTP signal.

FIG. 7 shows a design of a process 700 for sending a peer-to-peer (PTP) signal in a wireless network. A first terminal may receive a peer discovery signal from a second terminal (block 712). The first terminal may estimate pathloss to the second terminal based on a transmit power level of the peer discovery signal, a received power level of the peer discovery signal at the first terminal, and a receiver gain at the first terminal (block 714).

The first terminal may determine a receiver gain setting at the second terminal, e.g., based on signaling received from the second terminal, a maximum receiver gain setting or a predetermined receiver gain setting that is known a priori by the first terminal, etc. (block 716). The first terminal may determine a transmit power level for a PTP signal based on the estimated pathloss, the receiver gain setting at the second terminal, and a target received power level for the PTP signal, e.g., as shown in equation (4) (block 718). The PTP signal may be a paging signal, a control signal, a data signal, an acknowledgement signal, etc. The first terminal may then send the PTP signal at the determined transmit power level to the second terminal (block 720).

Figure 8:
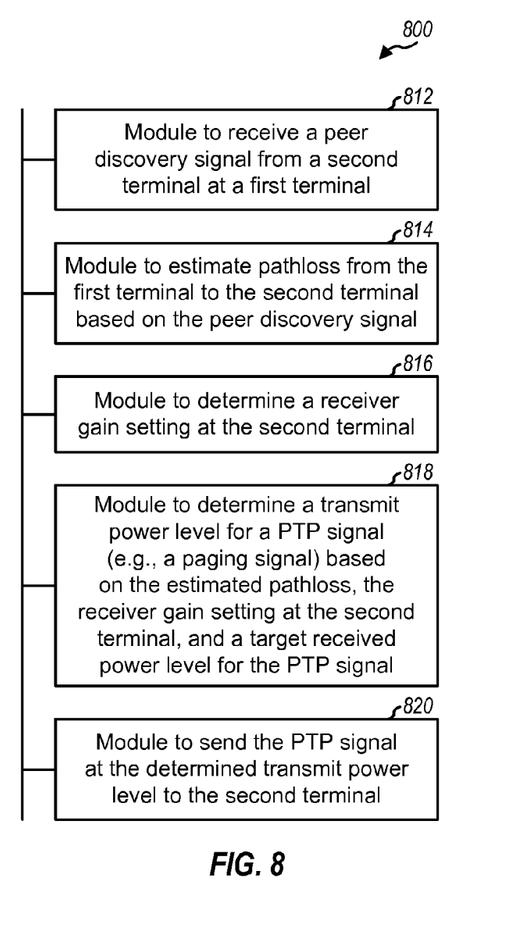
FIG. 8 shows an apparatus for sending a PTP signal.

FIG. 8 shows a design of an apparatus 800 for sending a PTP signal in a wireless network. Apparatus 800 includes a module 812 to receive a peer discovery signal from a second terminal at a first terminal, a module 814 to estimate pathloss from the first terminal to the second terminal, e.g., based on the transmit and received power levels of the peer discovery signal and a receiver gain at the first terminal, a module 816 to determine a receiver gain setting at the second terminal, a module 818 to determine a transmit power level for a PTP signal (e.g., a paging signal) based on the estimated pathloss, the receiver gain setting at the second terminal, and a target received power level for the PTP signal, and a module 820 to send the PTP signal at the determined transmit power level to the second terminal.

Figure 9:
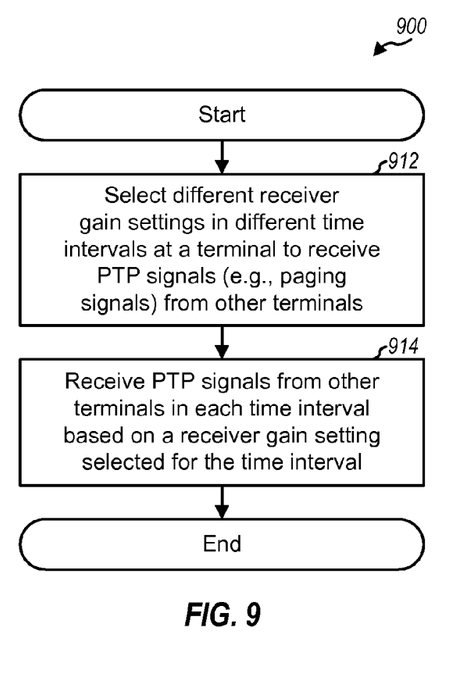
FIG. 9 shows a process for receiving PTP signals.

FIG. 9 shows a design of a process 900 for receiving PTP signals in a wireless network. A terminal may select different receiver gain settings in different time intervals to receive PTP signals (e.g., paging signals) from other terminals (block 912). The terminal may select different receiver gain settings based on (e.g., by cycling through) a pattern comprising multiple receiver gain settings. The terminal may send information indicative of the pattern to other terminals, or the pattern may already be known by the terminals. The different receiver gain settings may comprise a high receiver gain setting, a mid receiver gain setting, a low receiver gain setting, and/or other receiver gain settings.

The terminal may receive PTP signals from other terminals in each time interval based on a receiver gain setting selected for that time interval (block 914). For example, the terminal may receive paging signals from terminals with high pathloss during time intervals in which the high receiver gain setting is used. The terminal may receive paging signals from terminals with low pathloss during time intervals in which the low receiver gain setting is used.

Figure 10:
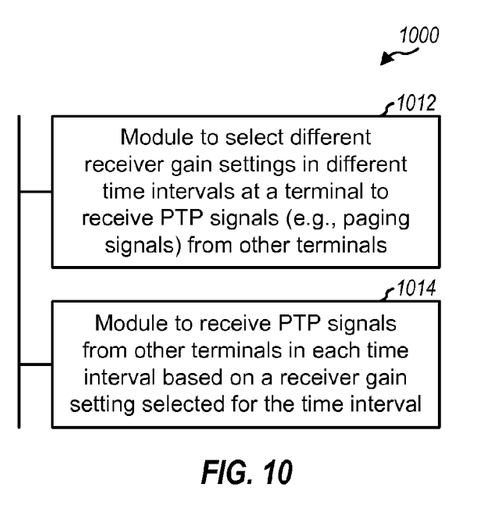
FIG. 10 shows an apparatus for receiving PTP signals.

FIG. 10 shows a design of an apparatus 1000 for receiving PTP signals in a wireless network. Apparatus 1000 includes a module 1012 to select different receiver gain settings in different time intervals at a terminal to receive PTP signals from other terminals, and a module 1014 to receive PTP signals from other terminals in each time interval based on a receiver gain setting selected for that time interval.

Figure 11:
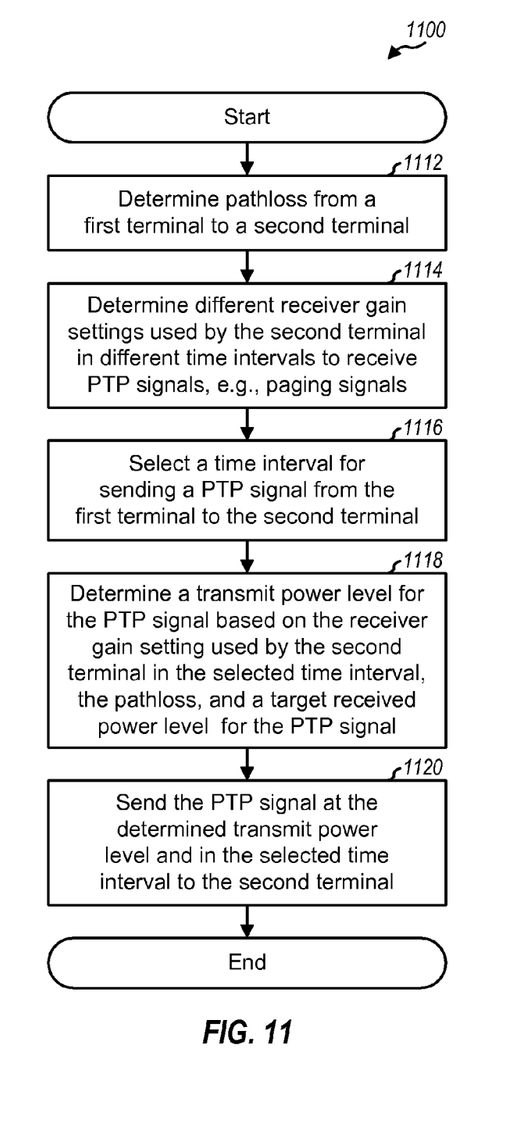
FIG. 11 shows another process for sending a PTP signal.

FIG. 11 shows a design of a process 1100 for sending a PTP signal in a wireless network. A first terminal may determine pathloss to a second terminal, e.g., based on a peer discovery signal received from the second terminal (block 1112). The first terminal may determine different receiver gain settings used by the second terminal in different time intervals to receive PTP signals, e.g., paging signals (block 1114). The different receiver gain settings may be determined based on a pattern, which may be known by the first terminal or received from the second terminal.

The first terminal may select a time interval for sending a PTP signal to the second terminal based on the different receiver gain settings used by the second terminal in different time intervals (block 1116). For example, the first terminal may select a time interval in which a high receiver gain setting is used by the second terminal if the pathloss is high, e.g., exceeds a first threshold. The first terminal may select a time interval in which a low receiver gain setting is used by the second terminal if the pathloss is low, e.g., is below a second threshold. The first terminal may determine a transmit power level for the PTP signal based on the receiver gain setting used by the second terminal in the selected time interval, the pathloss, and a target received power level for the PTP signal (block 1118). The first terminal may then send the PTP signal at the determined transmit power level and in the selected time interval to the second terminal (block 1120).

Figure 12:
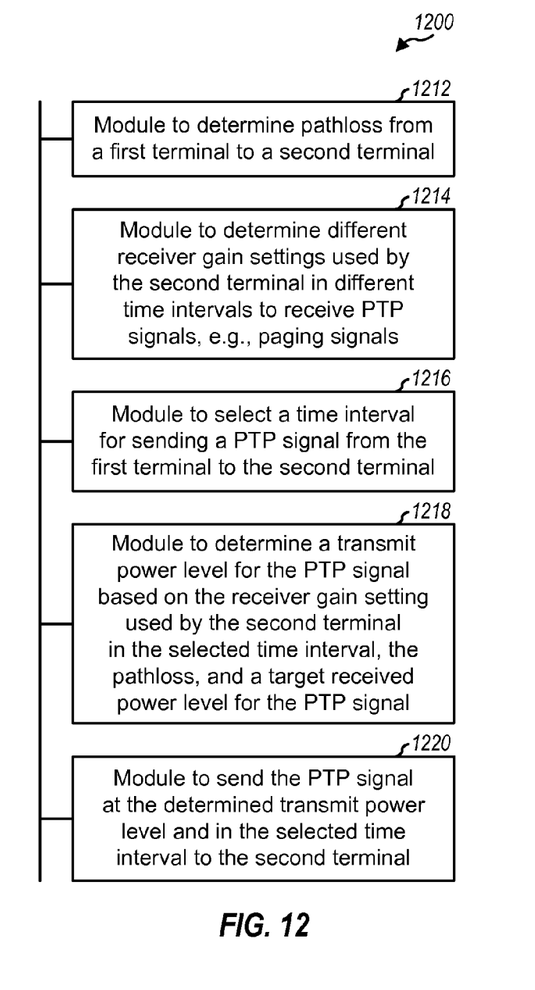
FIG. 12 shows another apparatus for sending a PTP signal.

FIG. 12 shows a design of an apparatus 1200 for sending a PTP signal in a wireless network. Apparatus 1200 includes a module 1212 to determine pathloss from a first terminal to a second terminal, a module 1214 to determine different receiver gain settings used by the second terminal in different time intervals to receive PTP signals (e.g., paging signals), a module 1216 to select a time interval for sending a PTP signal from the first terminal to the second terminal based on the different receiver gain settings used by the second terminal in different time intervals to receive PTP signals, a module 1218 to determine a transmit power level for the PTP signal based on the receiver gain setting used by the second terminal in the selected time interval, the pathloss, and a target received power level for the PTP signal, and a module 1220 to send the PTP signal at the determined transmit power level and in the selected time interval to the second terminal.

The modules in FIGS. 8, 10 and 12 may comprise processors, electronics devices, hardware devices, electronics components, logical circuits, memories, etc., or any combination thereof.

Figure 13:
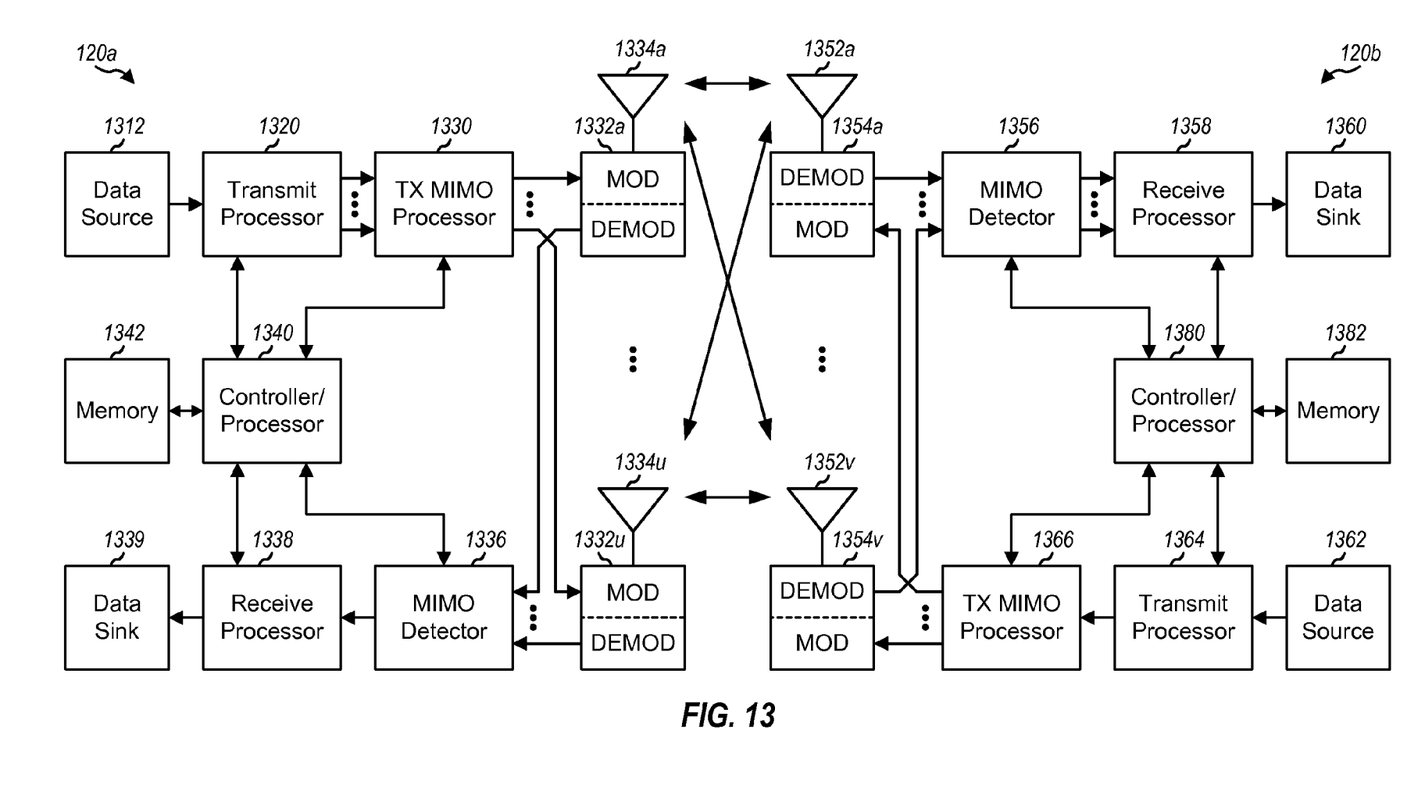
FIG. 13 shows a block diagram of two terminals.

FIG. 13 shows a block diagram of a design of terminals 120a and 120b, which are two terminals in wireless network 100 in FIG. 1. In this design, terminal 120a is equipped with U antennas 1334a through 1334u, and terminal 120b is equipped with V antennas 1352a through 1352v, where in general U≥1 and V≥1.

At terminal 120a, a transmit processor 1320 may receive data from a data source 1312 and control information from a controller/processor 1340. The control information may comprise information to send in a peer discovery signal, information to send in a paging signal, etc. Transmit processor 1320 may process (e.g., encode, interleave, and symbol map) the data and control information and provide data symbols and control symbols, respectively. A transmit (TX) multiple-input multiple-output (MIMO) processor 1330 may perform spatial processing (e.g., precoding) on the data symbols, the control symbols, and/or pilot symbols, if applicable, and may provide U output symbol streams to U modulators (MODs) 1332a through 1332u. Each modulator 1332 may process a respective output symbol stream (e.g., for OFDM, SC-FDM, etc.) to obtain an output sample stream. Each modulator 1332 may further process (e.g., convert to analog, amplify, filter, and upconvert) the output sample stream to obtain a radio frequency (RF) signal. U RF signals from modulators 1332a through 1332u may be transmitted via U antennas 1334a through 1334u, respectively.

At terminal 120b, antennas 1352a through 1352v may receive the RF signals from terminal 120a and may provide received signals to demodulators (DEMODs) 1354a through 1354v, respectively. Each demodulator 1354 may condition (e.g., filter, amplify, downconvert, and digitize) a respective received signal to obtain received samples. Each demodulator 1354 may further process the received samples (e.g., for OFDM, SC-FDM, etc.) to obtain received symbols. A MIMO detector 1356 may obtain received symbols from all V demodulators 1354a through 1354v, perform MIMO detection on the received symbols if applicable, and provide detected symbols. A receive processor 1358 may process (e.g., demodulate, deinterleave, and decode) the detected symbols, provide decoded data to a data sink 1360, and provide decoded control information to a controller/processor 1380.

At terminal 120b, data from a data source 1362 and control information from controller/processor 1380 may be processed by a transmit processor 1364, precoded by a TX MIMO processor 1366 if applicable, further processed by modulators 1354, and transmitted via antennas 1352. At terminal 120a, the RF signals from terminal 120b may be received by antennas 1334, processed by demodulators 1332, detected by a MIMO detector 1336 if applicable, and further processed by a receive processor 1338 to obtain the decoded data and control information transmitted by terminal 120b.

Each terminal 120 may generate and transmit a peer discovery signal, a paging signal, and/or other signals, e.g., using transmit processor 1320, TX MIMO processor 1330, and modulators 1332 at terminal 120a. Each terminal 120 may also detect for peer discovery signals, paging signals, and/or other signals from other terminals, e.g., using demodulators 1354, MIMO detector 1356, and receive processor 1358 at terminal 120b. Each terminal 120 may also receive and process signals from base stations and/or other transmitter stations for communication, to obtain timing and/or broadcast information, etc.

Controllers/processors 1340 and 1380 may direct the operation at terminals 120a and 120b, respectively. Controllers/processors 1340 and 1380 may each perform or direct process 700 in FIG. 7, process 900 in FIG. 9, process 1100 in FIG. 11, and/or other processes for the techniques described herein. Memories 1342 and 1382 may store data and program codes for terminals 120a and 120b, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    receiving a peer discovery signal from a second terminal;
    estimating pathloss from a first terminal to the second terminal based on a transmit power level and a received power level of the peer discovery signal;
    determining another transmit power level for a peer-to-peer (PTP) signal based on the estimated pathloss, a maximum value of a receiver gain setting at the second terminal, and a target received power level for the PTP signal at the second terminal, wherein the PTP signal is a paging signal sent by the first terminal to page the second terminal; and
    sending the PTP signal at the determined transmit power level to the second terminal.

2. The method of claim 1, further comprising:
    determining the receiver gain setting at the second terminal based on signaling received from the second terminal.

3. The method of claim 1, wherein the receiver gain setting at the second terminal is a predetermined receiver gain setting known a priori by the first terminal.

4. An apparatus for wireless communication, comprising:
    at least one processor configured to receive a peer discovery signal from a second terminal, estimate pathloss from a first terminal to the second terminal based on a transmit power level and a received power level of the peer discovery signal, to determine another transmit power level for a peer-to-peer (PTP) signal based on the estimated pathloss, a maximum value of a receiver gain setting at the second terminal, and a target received power level for the PTP signal at the second terminal, wherein the PTP signal is a paging signal sent by the first terminal to page the second terminal, and to send the PTP signal at the determined transmit power level to the second terminal.

5. An apparatus for wireless communication, comprising:
means for receiving a peer discovery signal from a second terminal;
means for estimating pathloss from a first terminal to the second terminal based on a transmit power level and a received power level of the peer discovery signal;
means for determining another transmit power level for a peer-to-peer (PTP) signal based on the estimated pathloss, a maximum value of a receiver gain setting at the second terminal, and a target received power level for the PTP signal at the second terminal, wherein the PTP signal is a paging signal sent by the first terminal to page the second terminal; and
means for sending the PTP signal at the determined transmit power level to the second terminal.

6. The apparatus of claim 5, wherein the means for estimating the pathloss comprises means for estimating the pathloss based on another transmit power level and a received power level of the peer discovery signal.

7. A computer program product, comprising:
a non-transitory computer-readable medium comprising:
code for causing at least one computer to receive a peer discovery signal from a second terminal;
code for causing the least one computer to estimate pathloss from a first terminal to the second terminal based on a transmit power level and a received power level of the peer discovery signal,
code for causing the at least one computer to determine another transmit power level for a peer-to-peer (PTP) signal based on the estimated pathloss, a maximum value of a receiver gain setting at the second terminal, and a target received power level for the PTP signal at the second terminal, wherein the PTP signal is a paging signal sent by the first terminal to page the second terminal, and
code for causing the at least one computer to send the PTP signal at the determined transmit power level to the second terminal.

8. A method for wireless communication, comprising:
selecting different receiver gain settings in different time intervals at a terminal to receive peer-to-peer (PTP) signals from other terminals, wherein the selecting is based on a pattern comprising multiple receiver gain settings; and
receiving PTP signals from other terminals in each time interval based on a receiver gain setting selected for the time interval,
wherein the different receiver gain settings comprise a high receiver gain setting, a low receiver gain setting, and a mid receiver gain setting, and wherein at least three different receiver gain settings are selected in different time intervals.

9. The method of claim 8, wherein the selecting different receiver gain settings comprises selecting different receiver gain settings in different time intervals based on a pattern comprising multiple receiver gain settings.

10. The method of claim 8, wherein the receiving PTP signals from other terminals comprises
receiving paging signals from terminals with high pathloss during time intervals in which the high receiver gain setting is selected, and
receiving paging signals from terminals with low pathloss during time intervals in which the low receiver gain setting is selected.

11. An apparatus for wireless communication, comprising:
at least one processor configured to select different receiver gain settings in different time intervals at a terminal to receive peer-to-peer (PTP) signals from other terminals, wherein the selecting is based on a pattern comprising multiple receiver gain settings, and to receive PTP signals from other terminals in each time interval based on a receiver gain setting selected for the time interval,
wherein the different receiver gain settings comprise a high receiver gain setting, a low receiver gain setting, and a mid receiver gain setting, and wherein at least three different receiver gain settings are selected in different time intervals.

12. The apparatus of claim 11, wherein the different receiver gain settings comprise a high receiver gain setting and a low receiver gain setting, and wherein the at least one processor is configured to receive paging signals from terminals with high pathloss during time intervals in which the high receiver gain setting is selected, and to receive paging signals from terminals with low pathloss during time intervals in which the low receiver gain setting is selected.

13. A method for wireless communication, comprising:
determining pathloss from a first terminal to a second terminal;
selecting a time interval for sending a peer-to-peer (PTP) signal from the first terminal to the second terminal based on different receiver gain settings used by the second terminal in different time intervals to receive PTP signals, wherein the selecting the time interval comprises selecting the time interval based further on the pathloss comprising selecting a first time interval in which a high receiver gain setting is used by the second terminal if the pathloss is high, and selecting a second time interval in which a low receiver gain setting is used by the second terminal if the pathloss is low;
determining a transmit power level for the PTP signal based on the receiver gain setting used by the second terminal in the selected time interval, the pathloss, and a target received power level for the PTP signal; and
sending the PTP signal to the second terminal in the selected time interval.

14. The method of claim 13, further comprising:
determining the different receiver gain settings used by the second terminal in different time intervals based on a pattern comprising multiple receiver gain settings.

15. An apparatus for wireless communication, comprising:
at least one processor configured to determine pathloss from a first terminal to a second terminal, select a time interval for sending a peer-to-peer (PTP) signal from a first terminal to a second terminal based on different receiver gain settings used by the second terminal in different time intervals to receive PTP signals, and to send the PTP signal to the second terminal in the selected time interval;
wherein the at least one processor is further configured to determine a transmit power level for the PTP signal based on the receiver gain setting used by the second terminal in the selected time interval, the pathloss, and a target received power level for the PTP signal; and
wherein the at least one processor is further configured to select a time interval based further on the pathloss comprising selecting a first time interval in which a high receiver gain setting is used by the second terminal if the pathloss is high, and selecting a second time interval in which a low receiver gain setting is used by the second terminal if the pathloss is low.

16. An apparatus for wireless communication, comprising:
means for selecting different receiver gain settings in different time intervals at a terminal to receive peer-to-peer (PTP) signals from other terminals, wherein the means for selecting is based on a pattern comprising multiple receiver gain settings; and means for receiving PTP signals from other terminals in each time interval based on a receiver gain setting selected for the time interval, wherein the different receiver gain settings comprise a high receiver gain setting, a low receiver gain setting, and a mid receiver gain setting, and wherein at least three different receiver gain settings are selected in different time intervals.

17. A computer program product, comprising:

a non-transitory computer-readable medium comprising:

code for causing at least one computer to select different receiver gain settings in different time intervals at a terminal to receive peer-to-peer (PTP) signals from other terminals, wherein the selecting is based on a pattern comprising multiple receiver gain settings; and code for causing the at least one computer to receive PTP signals from other terminals in each time interval based on a receiver gain setting selected for the time interval;

wherein the different receiver gain settings comprise a high receiver gain setting, a low receiver gain setting, and a mid receiver gain setting, and wherein at least three different receiver gain settings are selected in different time intervals.

18. An apparatus for wireless communication, comprising:

means for determining pathloss from a first terminal to a second terminal;

means for selecting a time interval for sending a peer-to-peer (PTP) signal from the first terminal to the second terminal based on different receiver gain settings used by the second terminal in different time intervals to receive PTP signals, wherein the selecting is based on a pattern comprising multiple receiver gain settings, and wherein the selecting the time interval comprises selecting the time interval based further on the pathloss comprising selecting a first time interval in which a high receiver gain setting is used by the second terminal if the pathloss is high, and selecting a second time interval in which a low receiver gain setting is used by the second terminal if the pathloss is low; and means for sending the PTP signal to the second terminal in the selected time interval.

19. A computer program product, comprising:

a non-transitory computer-readable medium comprising:

code for causing at least one computer to determine pathloss from a first terminal to a second terminal;

code for causing the at least one computer to select a time interval for sending a peer-to-peer (PTP) signal from the first terminal to the second terminal based on different receiver gain settings used by the second terminal in different time intervals to receive PTP signals, wherein the selecting is based on a pattern comprising multiple receiver gain settings, and wherein to select the time interval comprises to select the time interval based further on the pathloss comprising selecting a first time interval in which a high receiver gain setting is used by the second terminal if the pathloss is high, and to select a second time interval in which a low receiver gain setting is used by the second terminal if the pathloss is low; and code for causing the at least one computer to send the PTP signal to the second terminal in the selected time interval.

\* \* \* \* \*